United States Patent Office 2,888,497
Patented May 26, 1959

2,888,497

CHROMIUM OXIDE CATALYST AND METHOD OF PREPARING AND UTILIZING SAME

Emory W. Pitzer, Bartlesville, Okla., assignor to Phillips Petroleum Company, a corporation of Delaware No Drawing. Application September 27, 1954
Serial No. 458,713

16 Claims. (Cl. 260—680)

This invention relates to a novel catalyst composition. In one aspect it relates to a novel chromium oxide catalyst. In another aspect it relates to a method of preparing such a catalyst. In another aspect it relates to a method for the conversion of organic compounds. In another aspect it relates to a method for the dehydrogenation of hydrocarbons. In another aspect it relates to a method of polymerization of olefinic hydrocarbons.

Numerous methods for the preparation of catalysts have been proposed and utilized in the prior art. These methods include coprecipitation of two or more gels, impregnation of carriers with solutions of catalytic materials, and sublimation of catalytic materials onto carrier surfaces. Many of these methods are rather lengthy, involve numerous control steps, such as pH control, or are conducted at extremely high temperatures. Most of said methods are more or less complex in that they involve numerous preparation steps. One disadvantage which has accompanied certain prior art methods for the preparation of oxide or hydroxide gel catalysts has been the necessity for filtering or thickening a gelatinous hydroxide or hydrous oxide precipitate.

This invention provides a catalyst and a method for preparing same which is simple and direct and eliminates many of the disadvantages which accompany prior art preparation methods. In addition, it provides a catalyst of improved activity and efficiency and decreased tendency to form undesired by-products such as carbon or coke.

According to this invention, an improved catalyst is prepared by a method which includes, as an important step, the mixing and heating together of chromium trioxide and another oxide at a temperature in the range 200 to 374° F. The heating and comingling or agitation of the catalyst components takes place substantially in the dry state or solid phase. Thus it involves no pH control, precipitation, filtration or washing steps. The ingredients of the catalyst are mixed together as powders or granules and heated and agitated together to form the catalyst.

The broad temperature range at which the mixing and agitation of the catalyst components is conducted is 200–374° F. The reason why the simultaneous heating and agitation of the components within this range produce a superior catalyst is not definitely known. It is thought that, within the disclosed temperature range, the chromium oxide has an increased mobility which causes it to be distributed more or less uniformly over the surface of the other oxide. Below 200° F. the mobility appears to be negligible. At temperatures above 374° F. it appears that the chromium trioxide may be rapidly converted to some other oxide or some other form of the same oxide which is substantially immobile. It is to be understood, however, that the scope of the invention is not limited by this or any other theory of its operation. A preferred temperature range for the heating and agitation step is 212 to 374° F., since within this range, any water of hydration or other chemically bound water which is released is rapidly removed by vaporization. It has been found that a temperature in the range of 300 to 330° F. produces highly satisfactory results in the preparation of chromium oxide-aluminum oxide catalysts.

According to one embodiment of the invention, a catalyst is prepared by mixing together, in the desired proportions, solid comminuted chromium trioxide and solid comminuted alumina, heating the mixture at a temperature in the range previously disclosed, while subjecting the mixture to heating and agitation for at least 5 minutes, generally a period of time within the range 5 minutes to 70 hours, preferably 30 minutes to 50 hours, and subsequently heating the resulting composite at a temperature in the range 650 to 1000° F. for at least 15 minutes and preferably for a period of time in the range 1 to 4 hours, or longer if desired.

The latter heating step at the higher temperature is particularly desirable when the resulting catalyst is to be formed into pellets. In such a case, it is desired that the catalyst to be pelleted contain from 5 to 15 weight percent of chemically bound water, as determined by igniting a sample of the composite at a temperature of about 1800 to 2000° F. until no further weight loss is detectable and measuring the loss in weight. Following the heating at 650 to 1000° F., it is generally desirable that the composite be ground, since some agglomeration appears to occur during the preceding heating steps. It is usually preferred to grind to a maximum particle size of 50 mesh. However, grinding to larger sizes, such as 20 or 30 mesh is satisfactory, especially if the catalyst is to be used in the fluidized or suspended form and is not to be pelleted. The ground catalyst can be formed into pills or pellets when it is to be used in the form of a stationary or fixed bed. When the catalyst is to be used in the form of a mobile catalyst mass, pelleting is generally unnecessary.

The pelleting can be conducted by methods known in the art. For example, the powdered catalyst can be mixed with an organic binder such as a hydrogenated vegetable oil, formed into cylindrical pellets, and ignited in an oxygen atmosphere to remove the organic binder.

The stirring or agitation which accompanies the heating at from 200 to 374° F. can be accomplished by the use of mechanical stirrers, or by conducting a gas through the comminuted mass of catalytic components at such a velocity that the catalyst mass is fluidized or subjected to circulation or apparent ebullition as a result of the lifting action of the gas. Another method for accomplishing the agitation is by heating the catalytic components in a rotary kiln which continuously tumbles or turns the mass of powdered catalyst over upon itself.

It is generally preferred that the heating and agitation be conducted in the presence of a non-reducing atmosphere, and, for most purposes, it is preferred that the atmosphere be positively oxidizing. This is particularly true when the catalyst is to be used as a polymerization catalyst, as subsequently described. However, it is within the scope of the invention to conduct the heating and agitation step in the presence of a reducing gas when it is desired that the chromium be present in the catalyst in a reduced state. In one embodiment, the invention can be conducted by passing air or other oxidizing gas at a fluidizing velocity through a powdered mixture of chromium trioxide and alumina at a temperature in the range previously disclosed.

It is preferable to use alumina in a porous, or potentially porous, form in order to obtain maximum catalyst activity. Thus a hydrated form of the alumina can be used as a starting material, porosity being increased during the preparation by virtue of the dehydration which occurs during the heating steps. Suitable forms of alumina for use as starting materials are bauxite, Activated Alumina, alumina trihydrate, and precipitated alumina gel.

It is preferred that the starting materials have a particle size in the range 25 microns to 20 mesh in order to facilitate mixing.

In the preparation of a chromium oxide-alumina catalyst, it is within the scope of the present invention to add promoting, stabilizing, or other components to the mixture undergoing heating and agitation. Thus such compounds as beryllium oxide, copper oxide, magnesium oxide, strontium oxide, or potassium hydroxide can be added as such or in the form of compounds which are convertible to these oxides by the heating. The amount of such added oxides is ordinarily in the range 0.1 to 20 weight percent based on total catalyst weight. Such oxides or other compounds can be added before, during, or after the initial heating and mixing step described. Thus alumina can be impregnated with an aqueous solution of a compound ignitable to the added oxide, ignited, and used as a starting material for the heating and agitating step. Or, the added component can be added by impregnating the chromium oxide-alumina mixture, after the heating and agitation, with a suitable aqueous solution, drying, and igniting. A preferred method is to add the third component, e.g., strontium oxide, to the mixture of chromium trioxide and alumina and then heat and agitate as already described.

The scope of the invention is not limited to alumina as the additional catalyst component. The oxides, hydrous oxides, or hydroxides of silicon, zirconium, iron and/or titanium can be substituted for alumina. These materials or the alumina can be pretreated with an acid, such as hydrofluoric acid, if desired.

Chromium oxide-alumina catalysts prepared according to this invention are characterized by a bulk density in the range 1.25 to 1.40, which is greater than that of catalysts prepared by prior art methods.

The catalysts of this invention are particularly useful for promoting the dehydrogenation of organic compounds, particularly hydrocarbons. The chromium oxide-alumina catalysts are particularly active for the dehydrogenation of paraffins such as normal butane to form olefinic hydrocarbons such as butenes and butadiene. The catalysts can also be used for conversion of pentanes to pentenes and for the conversion of ethyl benzene and propyl benzene to styrene and derivatives thereof. Also, compounds such as cyclohexane can be converted to cyclohexene or benzene. The dehydrogenation is ordinarily conducted at temperatures in the range 950 to 1200° F., preferably 1000 to 1150° F., at relatively low pressures such as from 10 mm. Hg absolute to 50 p.s.i. and at gaseous (STP) space velocities in the range 200 to 2000, preferably 500 to 1500, volumes per volume of catalyst per hour.

The catalysts of this invention are also useful as catalysts for polymerizing olefins in a process of the type disclosed in the copending applications of J. P. Hogan and R. L. Banks, Serial No. 333,576, filed January 27, 1953, and now abandoned and J. P. Hogan and E. R. Francis, Serial No. 445,042, filed July 22, 1954. The polymerization according to the cited applications is conducted at a temperature in the range 150 to 450° F. When it is desired to produce a normally solid or tacky polymer, the olefinic feed is a 1-olefin having a maximum chain length of 8 carbon atoms and no branching nearer the double bond than the 4-position. Examples of such aliphatic olefins are ethylene, propylene, 1-hexene, 1-butene and 1-pentene. The reaction is generally conducted with the olefin in solution in a hydrocarbon solvent which is liquid and inert under the polymerization conditions. Examples of such hydrocarbon solvents are 2,2,4-trimethylpentane (isooctane) and naphthenes such as cyclohexane and methylcyclohexane.

The amount of chromium oxide in the final catalyst of this invention is, broadly, within the range 0.1 to 60 weight percent. When the catalyst is to be used for dehydrogenation, the chromium oxide concentration is preferably within the range 10 to 60, preferably 15 to 45, weight percent. When the catalyst is to be used for polymerization, the chromium oxide content should be, preferably, from 0.2 to 20 weight percent, at least part (0.1%) of which should be hexavalent chromium. The presence of hexavalent chromium can be insured by activating the catalyst by heating it in the presence of oxygen at from 650 to 1000° F. for a period of from 1 to 10 hours. It will be evident to those skilled in the art that the foregoing amounts and proportions of ingredients are based on total weight of finished catalyst, and that the amounts and proportions of starting materials are selected, on the basis of stoichiometric considerations, to obtain the disclosed proportions in the final catalyst.

When a polymerization catalyst is desired, a preferred catalyst composition comprises chromium oxide associated with a silica-alumina composite, for example a coprecipitated composite.

Catalysts of this invention are also suitable for other organic compound conversion reactions such as the dehydration of alcohols, the reforming of gasoline, the removal of sulfur from petroleum fractions, particularly in the presence of hydrogen, and other reactions known in the art.

After the catalysts of this invention have been used until they are rendered relatively inactive by the deposition of coke or carbon on the catalyst surface, they can be regenerated by combustion of the coke or carbon by methods known in the art.

EXAMPLE I

Three catalysts prepared according to the method of this invention were compared with three catalysts prepared according to prior art methods. The catalysts designated as catalysts I, II and III were catalysts prepared according to this invention. Catalysts IV, V and VI were prepared according to prior art methods.

Catalyst I was prepared according to the method of this invention and contained 40 percent chromium oxide and 60 percent alumina. The starting materials for the catalyst were alumina trihydrate ($Al_2O_3 \cdot 3H_2O$) and chromium trioxide ($CrO_3$), both being in the form of substantially dry powders. The two powdered oxides were mixed and heated at from 300 to 330° F. for 30 minutes while being constantly stirred manually and were then heated at 800° F. for 6 hours. The resulting composite was mixed with Sterotex (a hydrogenated corn oil), ground to pass a 50-mesh sieve and formed into cylindrical pellets.

Catalyst II had the same final composition as catalyst I. Alumina trihydrate and chromium trioxide were mixed and heated at from 300 to 330° F. for 30 minutes. A stream of oxygen at 300° F. was then passed through the mixture at a fluidizing velocity of a period for 48 hours. The resulting mixture was heated at 750° F. for 5 hours. The mixture was then mixed with Sterotex, ground to pass a 50-mesh sieve, and formed into cylindrical pellets.

Catalyst III contained 40 percent chromium oxide (considered as $Cr_2O_3$ for purposes of analysis), 59.25 percent aluminum oxide and 0.75 percent potassium hydroxide. Alumina trihydrate, chromium trioxide and potassium dichromate, as powders, were mixed and heated at 300° F. for 30 minutes while being mechanically stirred and were then heated at 750° F. for 5 hours. The resulting mixture was mixed with Sterotex, ground to pass a 50-mesh sieve and formed into pills.

Catalyst IV was prepared by the prior art method of gel precipitation. It had the same composition as catalyst III. Aluminum nitrate, ammonium dichromate and potassium dichromate were dissolved in water equal to 30 times the weight of the finished catalyst. The aqueous solution was stirred vigorously, and concentrated ammonium hydroxide (sp. g. 0.9) was added until the pH of the solution was 7.5. The resulting slurry was dried without filtration at 225° F. for 60 hours. The resulting material was heated to about 400° F. and was then heated at 800° F. for 18 hours. The resulting material was mixed with Sterotex, ground to pass a 50-mesh sieve, and formed into pills.

Catalyst V was also prepared by the prior art method of precipitation and contained 40 weight percent chromium oxide and 60 weight percent alumina. Aluminum nitrate and ammonium dichromate were dissolved in a quantity of water equal in weight to the weight of the finished catalyst. The mixture was vigorously stirred, and the gel was precipitated by the addition of concentrated ammonium hydroxide (sp. g. 0.9) until the pH was 7.5. The resulting slurry was dried without filtration at 225° F. for 40 hours. The dried catalyst was heated in small portions to 470° F. and was then calcined at 865° F. for 17 hours. The resulting catalyst was mixed with Sterotex, ground to pass a 50-mesh sieve and pilled.

In the foregoing preparations, the pills were formed by adding, to the catalyst, Sterotex equal in weight to 10 percent of the catalyst. The resulting mixture was formed into cylindrical pills ⅛ inch in diameter and ⅛ inch in length by the use of a Stokes BB-2 pilling machine. The Sterotex was removed from the pills by heating to 1000° F. over a period of 3 hours and maintaining the pills at 1000° F. for 20 hours in an atmosphere of air.

Catalyst VI was a commercially available catalyst believed to have been prepared by coprecipitation of chromia and alumina gels. The final catalyst contained 47 weight percent chromium oxide, 52.75 percent alumina, and 0.75 percent potassium hydroxide. The catalyst was utilized in the form of cylindrical pills ⅛ inch in length and ⅛ inch in diameter.

The catalysts were compared by utilizing each to dehydrogenate normal butane. The results of the tests are shown in Tables I and II.

*Table I*

DEHYDROGENATION OF NORMAL BUTANE WITH CATALYSTS MADE BY DRY IMPREGNATION AND BY PRECIPITATION

| Catalyst | I | II | II | II | II | II | II | III | III | III | III | III |
|---|---|---|---|---|---|---|---|---|---|---|---|---|
| Catalyst age, hr.ᵃ | 20 | 8 | 238 | 500 | 746 | 1,088 | 1,438 | 260 | 284 | 456 | 668 | 1,100 |
| Avg. sp. vel. v.(STP)/v./hr | 772 | 740 | 752 | 767 | 714 | 760 | 746 | 664 | 737 | 760 | 745 | 750 |
| Avg. temperature, °F | 1,057 | 1,055 | 1,052 | 1,057 | 1,054 | 1,056 | 1,060 | 1,054 | 1,061 | 1,052 | 1,056 | 1,055 |
| Total effluent analysis, wt. percent: | | | | | | | | | | | | |
| Hydrogen | 1.79 | 1.91 | 1.56 | 1.62 | 1.66 | 1.52 | 1.28 | 1.94 | 1.83 | 1.78 | 1.70 | 1.57 |
| Methane | 0.55 | 0.81 | 0.74 | 0.52 | 0.49 | 0.57 | 0.53 | 0.71 | 0.73 | 0.62 | 0.73 | 0.70 |
| Ethylene | 0.32 | 0.37 | 0.24 | 0.31 | 0.39 | 0.24 | 0.31 | 0.40 | 0.45 | 0.35 | 0.40 | 0.35 |
| Ethane | 1.15 | 1.33 | 0.82 | 1.00 | 1.39 | 0.86 | 1.16 | 1.45 | 1.54 | 1.28 | 1.44 | 1.26 |
| Propylene | 0.52 | 0.54 | 0.33 | 0.53 | 0.40 | 0.48 | 0.60 | 0.68 | 0.65 | 0.50 | 0.68 | 0.54 |
| Propane | 0.54 | 0.52 | 0.32 | 0.56 | 0.43 | 0.53 | 0.62 | 0.74 | 0.91 | 0.56 | 0.75 | 0.57 |
| C₅+ | 0.95 | 1.03 | 0.68 | 0.75 | 0.84 | 0.66 | 0.89 | 1.05 | 1.06 | 0.93 | 0.79 | 0.74 |
| Coke | 1.47 | 1.84 | 0.89 | 0.96 | 1.00 | 0.88 | 0.93 | 1.66 | 1.66 | 1.39 | 1.39 | 1.27 |
| 1-Butene | 0.91 | 0.90 | 0.93 | 0.92 | 0.92 | 0.92 | 0.92 | 0.90 | 0.89 | 0.91 | 0.90 | 0.91 |
| n-Butenes+butadiene | 37.08 | 38.12 | 34.40 | 33.43 | 34.57 | 32.27 | 29.40 | 30.18 | 36.07 | 36.42 | 33.43 | 30.81 |
| Butanes | 54.72 | 52.63 | 59.10 | 59.40 | 57.94 | 61.06 | 63.35 | 60.30 | 54.21 | 55.28 | 57.79 | 61.31 |
| Total per-pass conversion, wt. percent | 45.28 | 47.27 | 40.90 | 40.60 | 42.06 | 38.94 | 36.65 | 39.70 | 45.79 | 44.72 | 42.21 | 38.69 |
| Yield of n-butenes+butadiene, wt. percent: | | | | | | | | | | | | |
| Per pass | 37.08 | 38.12 | 34.40 | 33.43 | 34.57 | 32.27 | 29.40 | 30.18 | 36.07 | 36.42 | 33.43 | 30.81 |
| Ultimate | 81.89 | 80.64 | 84.11 | 82.34 | 82.19 | 82.87 | 80.22 | 76.02 | 78.77 | 81.44 | 79.20 | 79.63 |
| Apparent or bulk density of catalyst, grams per cc | 1.2592 | 1.2986 | 1.2986 | 1.2986 | 1.2986 | 1.2986 | 1.2986 | 1.3556 | 1.3556 | 1.3556 | 1.3556 | 1.3556 |

ᵃ Total age including dehydrogenation and regeneration periods.

*Table II*

DEHYDROGENATION OF NORMAL BUTANE WITH CATALYSTS MADE BY DRY IMPREGNATION AND BY PRECIPITATION

| Catalyst | VI | VI | VI | VI | VI | VI | IV | V |
|---|---|---|---|---|---|---|---|---|
| Catalyst age, hr.ᵃ | 10 | 282 | 474 | 728 | 1,050 | 1,434 | 20 | 36 |
| Avg. sp. vel, v. (STP)/v./hr | 720 | 709 | 731 | 711 | 725 | 719 | 764 | 769 |
| Avg. temperature, °F | 1,061 | 1,057 | 1,047 | 1,050 | 1,057 | 1,046 | 1,048 | 1,052 |
| Total effluent analysis, wt. percent: | | | | | | | | |
| Hydrogen | 2.11 | 1.82 | 1.75 | 1.67 | 1.60 | 1.59 | 1.94 | 2.11 |
| Methane | 1.10 | 0.86 | 0.91 | 0.80 | 0.87 | 0.53 | 0.93 | 1.09 |
| Ethylene | 0.49 | 0.42 | 0.44 | 0.47 | 0.41 | 0.31 | 0.47 | 0.50 |
| Ethane | 1.77 | 1.41 | 1.57 | 1.61 | 1.40 | 1.05 | 1.55 | 1.49 |
| Propylene | 0.80 | 0.69 | 0.85 | 0.92 | 0.67 | 0.49 | 0.63 | 0.79 |
| Propane | 0.86 | 0.67 | 0.86 | 0.90 | 0.66 | 0.48 | 0.66 | 0.68 |
| C₅+ | 1.04 | 0.79 | 0.87 | 0.72 | 0.88 | 0.94 | 0.98 | 1.59 |
| Coke | 2.47 | 1.97 | 1.85 | 1.64 | 1.70 | 1.48 | 2.26 | 4.32 |
| 1-Butene | 0.88 | 0.90 | 0.89 | 0.89 | 0.90 | 0.91 | 0.89 | 0.86 |
| n-Butenes+butadiene | 35.13 | 34.10 | 32.19 | 32.24 | 30.57 | 31.17 | 36.68 | 32.60 |
| Butanes | 53.32 | 56.37 | 57.82 | 58.14 | 60.34 | 61.04 | 53.20 | 53.97 |
| Total per-pass conversion, wt. percent | 46.68 | 43.63 | 42.18 | 41.86 | 39.66 | 38.96 | 46.97 | 46.03 |
| Yield of n-butenes+butadiene, wt. percent: | | | | | | | | |
| Per-pass | 35.13 | 34.10 | 32.19 | 32.24 | 30.57 | 31.17 | 36.68 | 32.60 |
| Ultimate | 75.26 | 78.16 | 76.32 | 77.02 | 77.01 | 80.01 | 78.09 | 70.82 |
| Apparent or bulk density of catalysts, grams per cc | 0.9321 | 0.9321 | 0.9321 | 0.9321 | 0.9321 | 0.9321 | 0.927 | 0.849 |

ᵃ Total age including dehydrogenation and regeneration periods.

In the runs represented by the data in Tables I and II, the feed was pure-grade normal butane analyzing 99.3 weight percent normal butane and 0.7 weight percent isobutane. The dehydrogenation was conducted utilizing the catalyst in the form of a fixed or stationary bed with one-hour dehydrogenation periods alternated with one-hour catalyst regeneration periods in which the deposited carbon or coke was removed by burning with air, which was passed through the catalyst at a gaseous hourly space velocity of 820 and at atmospheric pressure.

The data of Tables I and II are summarized in the following Table III wherein the catalysts are compared by showing their activities at 80 percent efficiency. The activity is the weight percent yield of normal butenes plus butadiene per pass. The activity at 80 percent efficiency was calculated by adjusting the actually determined activities to 80 percent efficiency. This adjustment was made by determining the difference between 80 and the percentage efficiency as actually determined, multiplying the difference by 0.8, and subtracting the resulting product from the actually determined activity when the latter was less than 80 or adding the product when the actually determined efficiency was greater than 80.

Table III
ACTIVITY OF CATALYSTS

| Catalyst Number | VI | V | IV | I | II | III |
|---|---|---|---|---|---|---|
| Approximate Catalyst Age, Days | Activity at 80% Efficiency, Wt. Percent ||||||
| 1 | 31.34 | 25.26 | 35.15 | 38.59 | 38.66 | 42.67 |
| 10 | 32.44 | | | | 37.69 | 35.09 |
| 20 | 29.25 | | | | 35.30 | 37.57 |
| 30 | 29.86 | | | | 36.32 | 32.79 |
| 45 | 28.18 | | | | 34.57 | 30.51 |

The following table shows the coke deposits produced by each of the catalysts tested.

Table IV
COKE DEPOSIT
[Conditions: 1 day age, 1050° F. and 750 sp. vel.]

| Catalyst | Coke Deposit, wt. percent of charge |
|---|---|
| VI | 2.47 |
| V | 4.32 |
| IV | 2.26 |
| I | 1.47 |
| II | 1.84 |
| III | 1.66 (10-day) |

The foregoing data show that the catalysts prepared by the dry impregnation method of this invention have higher activities at the same efficiency than do the catalysts prepared according to prior art methods. Stated another way, the catalysts of this invention have higher efficiency (produce higher ultimate yields) than prior art catalysts when compared at the same activity or conversion per pass. In addition, the catalysts of this invention produce smaller coke deposits than do the prior art catalysts. Therefore the catalysts of this invention can be used for longer periods without regeneration and are more economical since they convert less of the feed material to undesired coke deposits.

EXAMPLE II

A catalyst prepared according to this invention and containing 20 weight percent chromium oxide and 80 weight percent alumina was compared with a catalyst having the same composition and prepared by impregnation of alumina with aqueous chromic acid.

Catalyst VII was prepared by stirring and heating together 52.6 grams of chromium trioxide (reagent grade) and 240 grams of alumina trihydrate at 325° F. for 30 minutes, heating to 750° F. over a two hour period, calcining at 750° F. for 6 hours, adding 10 weight percent of Sterotex, forming ⅛ x ⅛-inch cylindrical pills, passing air over the pills at 7.50 liters per hour while raising the temperature to 1000° F. over a period of 3 hours and maintaining the temperature at 1000° F. for 18 hours to burn out the Sterotex.

Catalyst VIII was prepared by impregnating the periphery of an alumina carrier with an aqueous solution of chromium trioxide, followed by calcination, all as disclosed in U.S. Patent 2,606,159 (1952).

The above catalysts were compared for the dehydrogenation of normal butane. The results are shown in Table V.

Table V

| Catalyst | Cycle No. | Temp., ° F. | Space Vel., STP | Wt. Percent of Butane Feed |||||
|---|---|---|---|---|---|---|---|---|
| | | | | Conv. | Yield | Ult. Y. | Coke | 80% Yield [1] |
| VII | 9 | 1,062 | 784 | 44.20 | 35.31 | 79.89 | 1.87 | 35.22 |
| VIII | 16 | 1,057 | 726 | 40.07 | 30.81 | 76.89 | 1.63 | 28.32 |

[1] Yield calculated to 80% efficiency, as previously described.

The improved nature of the catalyst of this invention is evident from the conversion, the yield, the ultimate yield, and the yield at 80 percent efficiency, as shown in Table V.

Experience with catalyst VIII shows that there is substantially no loss in activity of that catalyst during the first 16 cycles of its use. Therefore the comparison of catalyst VII at an age of 9 cycles with catalyst VIII at the age of 16 cycles is a valid comparison.

EXAMPLE III

The effect of each of the steps of the preparation method of this invention is shown in Table VI.

Catalyst IX was prepared by mixing the components (alumina trihydrate and chromium trioxide) at room temperature.

Catalyst X was prepared by mixing the components at room temperature and then heating for 48 hours at 330° F. without mixing.

Catalyst XI was prepared by heating the components while mechanically agitating for a period of 30 minutes at 330° F.

Each of the catalysts, after the steps disclosed above, was calcined at 750° F. for 3 hours, ground and formed into pills as described in connection with the preceding examples, and further calcined for 21 hours at 1000° F. Each contained 40 weight percent chromium oxide and 60 percent alumina. All of the catalysts were utilized for the dehydrogenation of normal butane, as previously described.

Table VI

| Catalyst | Cycle No. | Temp., ° F. | Sp. Vel., STP | Wt. Percent of Butane |||||
|---|---|---|---|---|---|---|---|---|
| | | | | Conv. | Yield | Eff. | Coke | 80% Yield [1] |
| IX | 9 | 1,060 | 814 | 39.27 | 30.62 | 77.79 | 2.20 | 29.00 |
| X | 8 | 1,052 | 764 | 40.37 | 32.15 | 79.64 | 1.85 | 31.86 |
| XI | 46 | 1,050 | 782 | 40.28 | 33.52 | 83.22 | 1.08 | 36.10 |

[1] Yield calculated to 80% efficiency, as previously described.

The effect of each of the operations of the present invention is clearly shown from the above data.

EXAMPLE IV

A catalyst is prepared by heating together, at 320° F., 5 pounds of chromium trioxide powder (20 mesh) and 100 pounds of a coprecipitated composite cracking catalyst comprising 90 weight percent silica and 10 weight percent alumina for 2 hours. Air is passed upwardly through the mixture at a fluidizing velocity during the heating. Subsequently, the resulting mixture is heated at 750° F. for 2 hours. The resulting mixture is ground to a maximum size of 20 mesh and then heated in a stream of anhydrous air (CaCl$_2$-dried) for 2 hours at 750° F. and for 2 more hours at 1000° F.

One pound of the catalyst is suspended in 10 pounds of c.p. cyclohexane (redistilled) in an autoclave equipped with a motor-driven stirrer (300 r.p.m.), and the mixture is heated to 250° F. Ethylene, freed of oxygen, is pressured into the autoclave for a 10-hour period at a maximum pressure of 450 p.s.i., the temperature remaining at about 250° F.

The autoclave contents are cooled, the pressure is released, and the liquid phase and the suspended solid is diluted with 10 pounds of cyclohexane and heated under pressure with stirring, at 300° F. for two hours and filtered, hot and under pressure, to remove the catalyst. The filtrate is cooled to room temperature to precipitate the dissolved polymer, which is recovered by filtration. Fifteen pounds of polyethylene having an average molecular weight of 30,000 is thus obtained.

Air is excluded from the described polymerization, dissolution, and filtration operations. The dissolution of the polymer and the filtrations are conducted at the vapor pressures of the respective mixtures.

From the foregoing it will be seen that I have provided an improved catalyst and an improved method for preparing the same which comprises heating together chromium oxide and an additional oxide, while agitating, at a temperature in the range 200 to 374° F., and subsequently calcining and grinding, and that I have provided a method for the conversion of organic compounds, including the dehydrogenation and polymerization of hydrocarbons, in the presence of such a catalyst. While certain examples, compositions and process steps have been described for purposes of illustration, it is clear that the invention is not limited thereto.

I claim:

1. In a process for preparing an active catalyst comprising chromium oxide together with at least one oxide of an element selected from the group consisting of aluminum, silicon, titanium, iron and zirconium, the improvement which comprises heating and agitating together particulate chromium trioxide and at least one particulate oxide of said group at a temperature in the range 200 to 374° F. for a period of at least 5 minutes and subsequently calcining the mixture at a temperature of at least 650° F.

2. A process which comprises simultaneously heating and agitating solid comminuted chromium trioxide together with a comminuted porous solid oxide of an element selected from the group consisting of aluminum, silicon, titanium, iron and zirconium for at least five minutes at a temperature in the range 200 to 374° F., heating a resulting composite at a temperature in the range 650 to 1000° F. for at least 15 minutes, and recovering a resulting catalytic composite.

3. A process which comprises simultaneously heating and agitating solid comminuted chromium trioxide together with solid comminuted hydrated alumina for a time in the range from 30 minutes to 50 hours at a temperature in the range 200 to 374° F., heating the resulting mixture at a temperature in the range 650 to 1000° F. for from 1 to 4 hours, grinding the resulting mixture, and recovering a catalytic composite.

4. A process according to claim 3 wherein said mixing is accomplished by mechanically stirring the mixture.

5. A process according to claim 3 wherein said mixing is effected by fluidizing the mixture with a stream of gas.

6. A process according to claim 3 wherein the mixing is effected by tumbling the mixture.

7. A process which comprises simultaneously heating and agitating solid comminuted chromium trioxide together with solid comminuted hydrated alumina for a time in the range 30 minutes to 50 hours at a temperature in the range 212 to 374° F. in the presence of an oxygen-containing gas, heating the resulting mixture at a temperature in the range 650 to 1000° F. for a time in the range 1 to 4 hours, grinding the resulting mixture to at least as fine as 20 mesh, and pelleting the ground mixture, the chromium trioxide being initially present in such a proportion as to provide a final chromium oxide content in the range 0.1 to 60 weight percent.

8. A process which comprises mixing comminuted chromium trioxide with comminuted alumina trihydrate, heating and agitating the mixture in the presence of oxygen at a temperature in the range 300 to 330° F. for a time in the range from 30 minutes to 50 hours, heating the resulting composite at a temperature in the range 650 to 1000° F. for a time in the range 1 to 4 hours, grinding the mixture to a maximum particle size of 50 mesh, and pelleting the mixture, the chromium trioxide and the alumina trihydrate initially being present in a ratio corresponding to from 15 to 45 weight percent chromium oxide in the final mixture.

9. A process according to claim 8 wherein the agitation is effected by mechanical stirring.

10. A process according to claim 8 wherein the agitation is effected by fluidizing the mixture with an oxygen-containing gas.

11. A process which comprises mixing together chromium trioxide, alumina trihydrate and potassium dichromate, all in comminuted form, in proportions corresponding to from 20 to 50 weight percent Cr$_2$O$_3$, from 0.1 to 20 weight percent KOH, and the remainder Al$_2$O$_3$, agitating and heating the mixture at a temperature in the range 300 to 330° F. for a time in the range 30 minutes to 50 hours, heating the resulting mixture at a temperature in the range 650 to 1000° F. for a time in the range 1 to 4 hours, grinding to a maximum particle size of 50 mesh, and pelleting.

12. A chromium oxide-alumina catalyst comprising from 0.1 to 60 weight percent chromium oxide and having a bulk density in the range 1.25 to 1.40, said catalyst having been produced by a method comprising heating and agitating together comminuted chromium trioxide and comminuted hydrated alumina at a temperature in the range 200 to 374° F. for from 5 minutes to 70 hours and calcining the resulting mixture at a temperature in the range 650 to 1000° F. for a time in the range from 1 to 4 hours.

13. A catalyst according to claim 12 wherein the chromium oxide content is in the range 0.2 to 20 weight percent, a substantial part of the chromium is in the hexavalent state, and a substantial amount of silica is present in said catalyst.

14. A catalyst having a bulk density in the range 1.25 to 1.40 and comprising from 15 to 45 weight percent chromium oxide, the remainder being preponderantly alumina, said catalyst having been prepared by a method comprising heating and agitating together comminuted chromium trioxide and comminuted hydrated alumina at a temperature in the range 212 to 374° F. for a time in the range 30 minutes to 50 hours, calcining the resulting mixture at a temperature in the range 650 to 1000° F. for a time in the range 1 to 4 hours, grinding to a maximum particle size of 50 mesh, mixing with an organic binder, pelleting and removing the binder by ignition in air.

15. A process for dehydrogenating a dehydrogenatable hydrocarbon which process comprises contacting said hydrocarbon at a temperature in the range 950 to 1200° F. with a catalyst comprising from 10 to 60 weight percent chromium oxide, the remainder being preponderantly alumina, and having a bulk density in the range 1.25 to 1.40, said catalyst having been produced by a method comprising heating and agitating together comminuted chromium trioxide and comminuted hydrated alumina at a temperature in the range 200 to 374° F. for from 5 minutes to 70 hours, and calcining the resulting mixture at a temperature in the range 650 to 1000° F. for a time in the range 1 to 4 hours.

16. A process which comprises heating and agitating, substantially in the dry state, particulate chromium trioxide together with a particulate solid oxide of an element selected from the group consisting of aluminum, silicon, titanium, iron and zirconium at a temperature in the range 200 to 374° F. for at least 5 minutes, subsequently calcining a resulting mixture, and recovering the resulting catalytic composite.

References Cited in the file of this patent

UNITED STATES PATENTS

| | | |
|---|---|---|
| 2,124,567 | Grosse | July 26, 1938 |
| 2,332,276 | Stahly | Oct. 19, 1943 |
| 2,499,675 | Owen | Mar. 7, 1950 |
| 2,678,259 | Banner et al. | May 11, 1954 |
| 2,691,647 | Field et al. | Oct. 12, 1954 |
| 2,737,471 | Denton | Mar. 6, 1956 |
| 2,754,345 | Kirshenbaum | July 10, 1956 |